United States Patent [19]

Gardener

[11] Patent Number: 5,160,558
[45] Date of Patent: Nov. 3, 1992

[54] PETRI DISH STACK TRANSFER SYSTEM

[76] Inventor: James H. Gardener, 8101 S. Victor Pike, Bloomington, Ind. 47403

[21] Appl. No.: 562,792

[22] Filed: Aug. 6, 1990

[51] Int. Cl.$^5$ ............................................. B32B 35/00
[52] U.S. Cl. ..................... 156/60; 156/384; 156/569; 156/570; 156/571; 414/788.1; 414/788.4; 414/788.5; 414/788.6; 414/789.5; 414/754; 414/769; 414/776; 53/147
[58] Field of Search ............... 156/569, 570, 571, 384, 156/60; 414/788.1, 788.4, 788.5, 788.6, 789.5, 754, 769, 773; 53/147

[56] References Cited

U.S. PATENT DOCUMENTS

| | | | |
|---|---|---|---|
| 2,324,930 | 7/1943 | Joa | 414/788.1 |
| 4,030,528 | 6/1977 | Horning | 414/788.5 |
| 4,160,507 | 7/1979 | Mullins | 414/773 |
| 4,610,616 | 9/1986 | Kosman | 414/773 |
| 4,755,093 | 7/1988 | Francioni | 414/788.4 |

*Primary Examiner*—Caleb Weston
*Attorney, Agent, or Firm*—Woodward, Emhardt, Naughton, Moriarty & McNett

[57] ABSTRACT

Agar-filled petri dishes with covers on them are taken in rows from a first conveyor belt through interface equipment to a horizontal infeed conveyor transporting them in axially aligned packs of ten through a conventional wrapping machine. Two alternate types of interface are used. A "parallel" interface stacks dishes from six columns simultaneously adjacent the end of the first conveyor, to create six stacks of dishes. These are transferred as a group to a lateral conveyor. The lateral conveyor transports the six stacks to a single stack transfer station where a transfer wheel having a horizontal axis receives the stacks and turns them from a vertical attitude to a horizonatal attitude moving in synchronization with the linear motion of the infeed conveyor. The alternate "serial" interface takes the dishes from the first conveyor and transports them laterally, single file through a labeler and printer to a stacker where they are stacked in six stacks, and then transferred to another conveyor and transported to the single stack transfer station. The transfer wheel has four pivoting arm units equally spaced around a circle with a toggle feature to alternately posture the arms to grip a stack as it is turned by the wheel from the vertical to the horizontal orientation.

26 Claims, 10 Drawing Sheets

PETRI DISH STACK TRANSFER SYSTEM

BACKGROUND OF THE INVENTION

This invention relates to the high volume production of petri dishes filled with prepared culture media. The media is an agar based product that gels at 95° F. approximately. A loose fitting cover completes the petri dish assembly. The filled dishes with cover on them are assembled in stacks of ten and bagged in heat sealed film.

The prior art practice of high volume producers has been to place the stacks in a horizontal infeed conveyor to the bagging machine. Each stack of ten dish assemblies is removed from a stacker by hand, held together by hand and then turned horizontal by hand and placed on the horizontal infeed conveyor with the dish assemblies on edge and the stack is held together between spring loaded lugs on the conveyor as the stack is carried on the conveyor to the bagger.

The stack of dishes is a loose unstable unit, and difficult to handle. I believe that the closest technology for handling this type of product shape is in the food industry, for things such as rice cakes, using the on-edge type of infeed. However, these types of products are basically stable and not critical of rough handling. The conventional methods for handling them are unsuitable for the needs of the prepared petri dish industry.

It is an object of my invention to provide that petri dishes with gelled medium in them be stacked and mechanically placed into a moving infeed drive system of uniformly pitched drive lugs whose direction of movement is 90° to the axis of the stacks as they are produced.

It is another object that the integrity of the dish be maintained during the procedure.

SUMMARY OF THE INVENTION

According to a typical embodiment of my invention, a four station horizontal axis "ferris" wheel provides the basic means of interfacing with the linear motion of the infeed conveyor. The pitch of each station is matched to that of the infeed lug pitch. The wheel is driven by a power take-off from the infeed conveyor at a suitable ratio thereby providing synchronization. A clutch provides snap override in the event of interference, and resets easily without the need to re-time the wheel. The wheel has four pivoting arm units, equally spaced around a circle. Each arm will swing within a 90° restricted arc. Further, each arm is biased with a spring, to toggle each side of center. Each petri dish stack is positioned radially to the wheel, and symmetrical with the rotational center of the wheel. The arms are swung to the proper position as the wheel rotates, by external kick pins. In the feed position, the stack is supported temporarily by spring loaded seat plates, which swing away and return as the stacks are transferred by the wheel.

Parallel descent rails of the proper radius provide guidance for the stack during transfer from the wheel to the infeed conveyor. The wheel and arms are positioned symmetrically on the center line of the single row infeed drive chain lugs. This provides the clearance for the interaction of the wheel arms and the infeed lugs as they move together.

Alternate arrangements for interfacing from the filled dish transport conveyor to the wheel loader are provided. One transfers rows of dishes over a scanning printer and then to a parallel stacker. The other uses a dish transport single file through labeling and printing stations to a stacker and stack transfer device.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
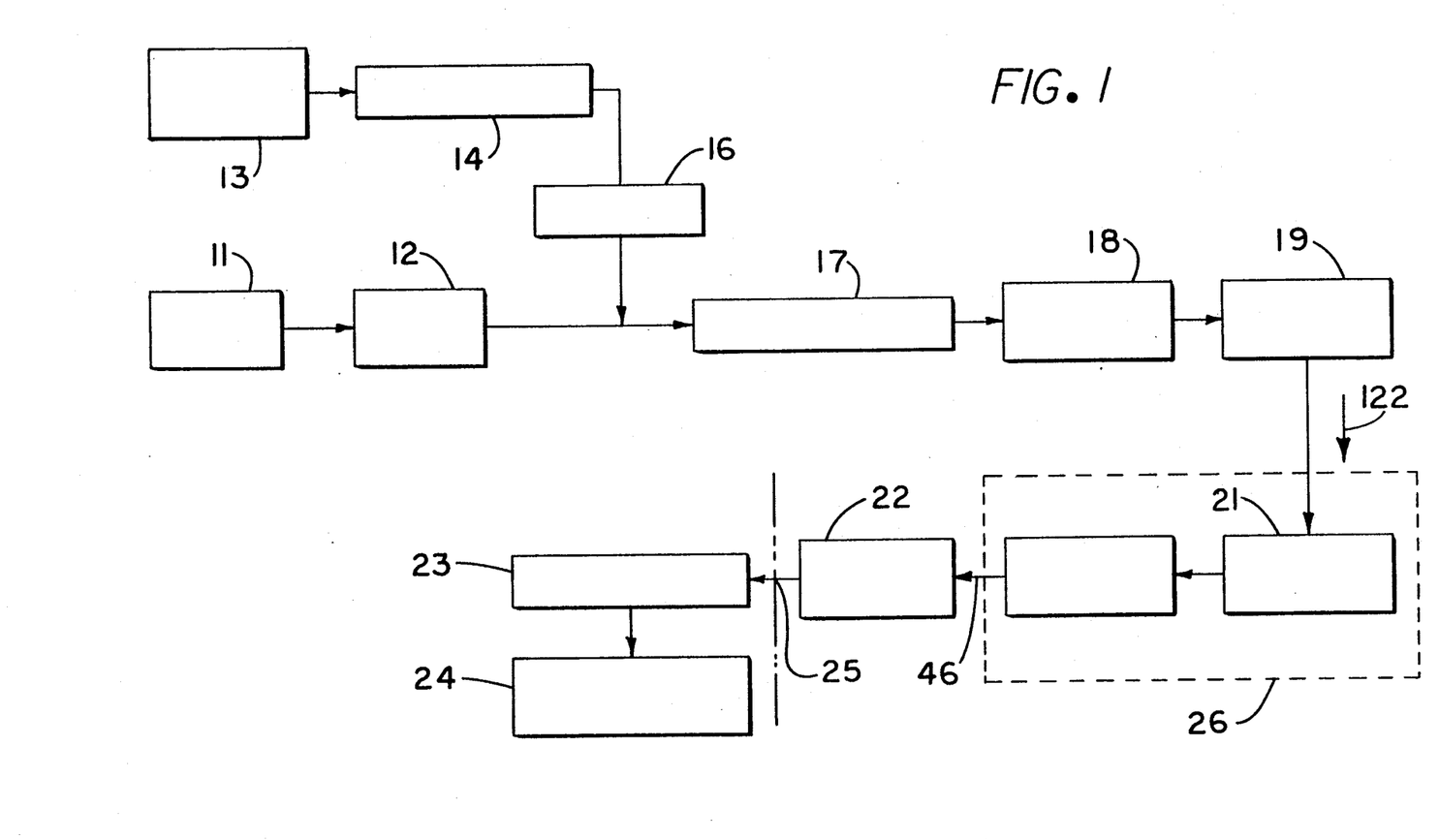
FIG. 1 is a block diagram of a process of preparing petri dish assemblies in which the articles are handled using a "parallel stacker" with the stacks being transferred from the end of the cooling belt to the wrapper infeed wheel of this invention and from which they move on the wrapper infeed conveyor to the wrapper system.
Figure 12:
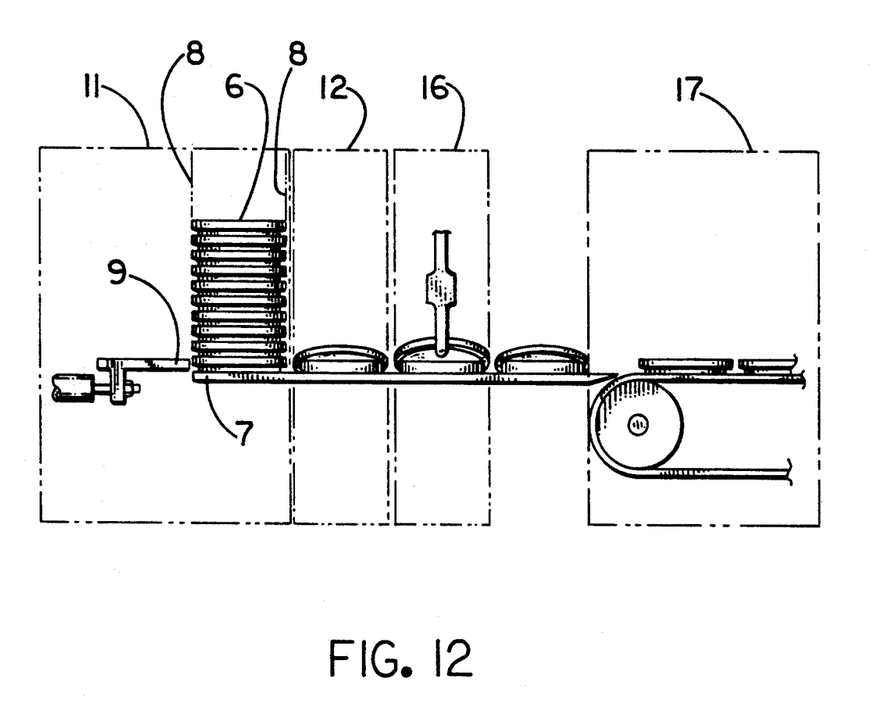
FIG. 12 is a schematic elevational diagram of the dish loading, filling and cooling portions of FIGS. 1 and 2.
Figure 13:
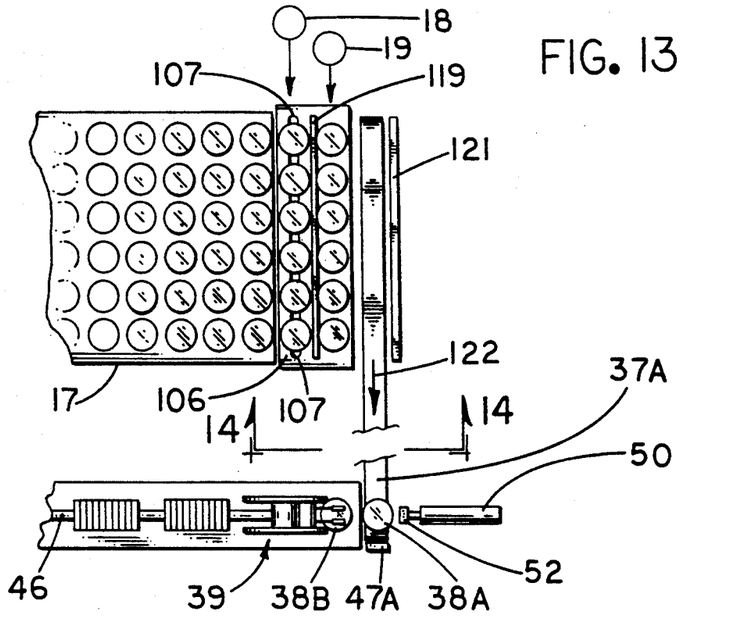
FIG. 13 is a schematic plan diagram of the parallel stacker interface from the apparatus of FIG. 12 to the wrapper system 22 in FIG. 1.

Referring now to the drawings in detail, and particularly FIGS. 1 and 12, for general orientation purposes, the processing occurs as indicated in general by the direction of the arrows from block-to-block. Starting at the upper left, at the loading station 11, empty assemblies 6 of petri dishes with covers are stacked onto a stationary surface 7 and confined by vertical guides 8. The bottom dish assembly in the stack is pushed to the right from under the stack by a transfer bar 9 operated periodically by a pneumatic cylinder. As each assembly is pushed to the right, a stationary ramp at each side of the path of the assembly, beginning at station 12, lifts the cover which is of a greater diameter and thss overhangs the dish and can ride up and then down the ramps as the assembly is pushed to the right. The cover is lifted (but not removed) to admit a dispenser nozzle. An agar product in aqueous form moves from a source 13 through a sterilizer 14 and dispenser nozzle at station 16 from which the agar product is deposited in a measured amount in the dish. As the dish is pushed to the right, the cover descends the ramps, and the cover returns to rest on and covers the dish. The filled dish assembly is pushed further to the right, by the column of assemblies to its left, until it is pushed off the surface 7 onto the upper flight of a continuously operating endless belt article conveyor at 17 for cooling the dish to gel the agar product in it as the upper flight moves the dish assembly to the right. FIG. 13 shows six columns of filled dish assemblies moving toward the discharge end of cooling conveyor 17. Each of these columns is organized and operated as just heretofore described. Successive rows of six dishes each are filled and advanced, thus generating the six columns of filled petri dish assemblies moved along by the conveyor 17 through the cooling region. From there they are moved by a transfer bar through a scanning printer station 18 at which identification information may be placed on the bottom of the dish. From there they move into the parallel stacker 19. The conveyor equipment mentioned to this point may be conventional and well known in the art. Further conventional equipment is indicated at the wrapper system 22 in FIG. 1 where the horizontally disposed stacks of ten dish assemblies each are automatically wrapped, ten to a stack, and from there they are moved out of the environmentally controlled room at 25, and on to packaging location 23 where the wrapped stacks are manually packed into cartons. The packed cartons are moved to refrigerated storage at 24. The present invention is involved at the printers and stackers and stack transfer region 26 which will be described in further detail hereinafter.

Figure 2:
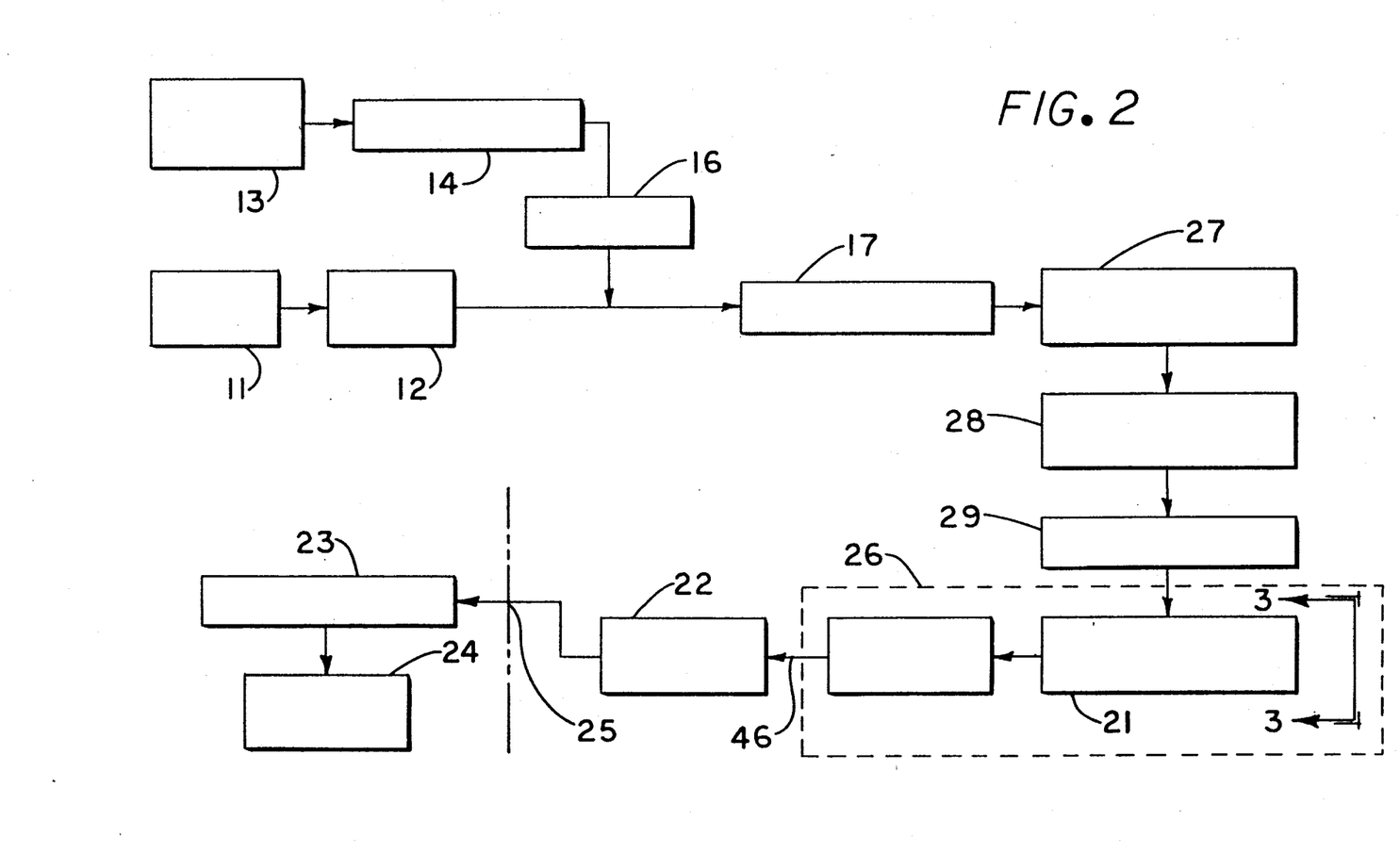
FIG. 2 is a block diagram of a process of manufacturing petri dish assemblies and where, instead of using a parallel stacker, the dish assemblies are moved from the cooling belt in a single file through a labeler and printer and stacker according to another feature of this invention and then to the stack transfer wheel of the invention onto the wrapper infeed conveyor.

Referring now to FIG. 2, the processing system to the end of the cooling conveyor 17 may be the same as in the FIG. 1 process. However, in contrast to the parallel stacking, another feature of the present invention is employed here. At the end of the cooling conveyor 17, there is a transfer of the filled and covered petri dish assemblies at station 27 where they move off the end of conveyor 17 onto a lateral conveyor as will be described hereinafter with reference to FIG. 16. The assemblies are moved single file from station 27 through the labeler and printer station 28, and stacker 29 to the stack transfer region 31. From there the stacks are moved through the wrapper system 22. The wrapped stacks leave the environmentally controlled room at 25 and into the packaging location 23 where the wrapped stacks are hand packed into cartons. The packed cartons are then moved to refrigerated storage 24 as in the FIG. 1 process.

Figure 3:
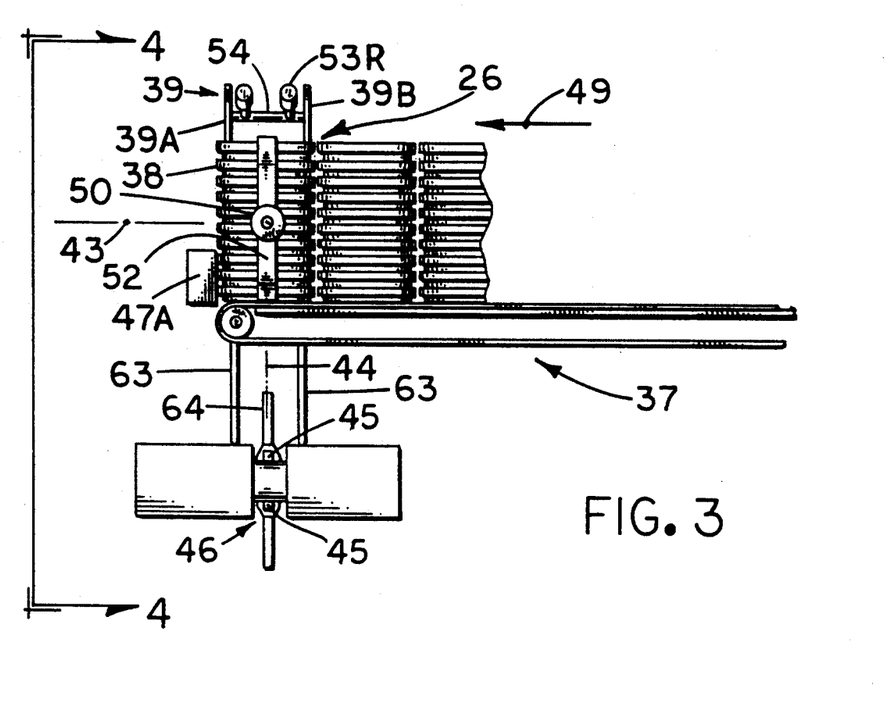
FIG. 3 is an elevational view of the stack transfer region 31 viewed in the direction of arrows 3—3 in FIG. 2.
Figure 4:
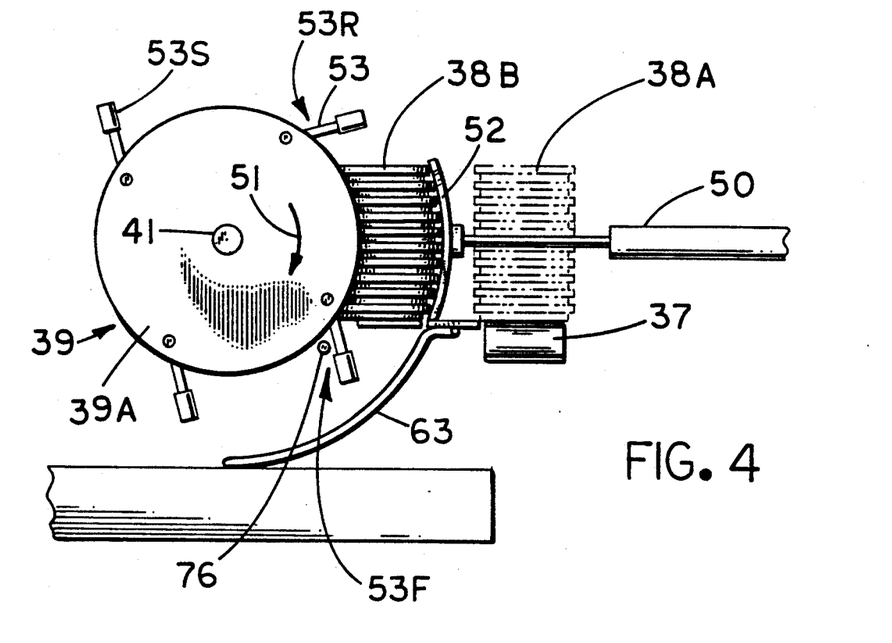
FIG. 4 is an elevational view thereof as viewed from line 4—4 in FIG. 3 and viewed in the direction of the arrows.

Regardless of whether it is the parallel stacker 19 of FIG. 1 or the stacker 29 of FIG. 2 that is used, the stacks will be moved to the transfer region 26 (FIGS. 1, 2 and 3) on an endless belt stack conveyor such as 37 where the leading stack 38 is at the end of the upper flight of the conveyor. A stack transfer wheel 39 is connected to a horizontal shaft 41 mounted in pillow blocks on stationary frame uprights 42 (FIG. 8) whereby the wheel is rotatable on a horizontal axis 43 fixed in space. The wheel is symmetrical about a vertical plane 44 (FIG. 3) in which the endless drive chain 45 of an infeed conveyor 46 operates. The leader stack 38 of petri dish assemblies is confined by a stationary wall 47A which stops movement of the stack in the direction of arrow 49 by the conveyor 37 so that the vertical axis of stack 38 lies in plane 44. When in this position, the stack is positioned to be pushed by a frame mounted actuator cylinder 50 from the position shown by the dotted line 38A (FIG. 4) to the position 38B against the wheel 39. This is the stack placement step in the operation as the wheel 39 turns in the clockwise direction of arrow 51. The transfer bar 52 on the piston rod of cylinder 50 is curved to conform the stack from the strictly vertical linear configuration as it is on the end of conveyor 37 to the curvilinear configuration when it is placed against the wheel 39 as shown in FIG. 4.

The wheel 39 has four pairs of retainer arms 53. Each pair of arms is mounted on a shaft 54 pivotally mounted in the side plates 39A and 39B of the wheel 39. The arms 53 are horizontally spaced on opposite sides of plane 44, and the distal end of each arm is covered with a latex sleeve 53S as shown. The attitude of each pair of arms with respect to the wheel is in either one or the other of two positions which are 90° apart. Each position is maintained by a toggle spring 55 (FIG. 11), with the arms being stopped in either of the two positions by one or the other of the stop pins 56 and 57 secured to the wheel side plate 39B and projecting inward to the space between plates 39A and 39B. The wheel side plates 39A and 39B are spaced apart a distance such as to provide a cradle for the stack of dishes as can be seen in the FIG. 8 view looking end-wise at the conveyor chain 45 of the infeed conveyor 46. The operation of the wheel is synchronized with that of the conveyor by the timing belt 58 coupling the pulley 59 on the conveyor drive shaft 61 to the pulley 62 on the transfer wheel shaft 41.

Descent guiderails 63 are provided below and to the right (in FIG. 4) of the wheel 39, these rails being parallel to each other in horizontally spaced vertical planes parallel to plane 44, and of uniform radius with respect to the shaft axis 43 of the transfer wheel. The infeed conveyor 46 has a plurality of spring-loaded lugs 64 spaced along its length. Where these lugs engage stacks, the front lug such as 64F (FIG. 7) in front of the stack as it moves along, can resiliently pivot to some extent in the counterclockwise direction of the arrow 67 to accommodate the transition from wheel 39 to the infeed conveyor. Due to the spacing of the pivot axes of these lugs on the chain links, and the overall length of a stack from end-to-end, the front lug 64F will resiliently engage the stack to hold the dishes with covers snugly together as they are moved along the conveyor 46, being guided by the guide trough sides 68 (FIG. 8) and pushed by the rear lug 64R which is rigidly erect as it is moved along by the upper flight of the endless conveyor chain 45.

An example of a suitable infeed conveyor and wrapping system is the Allpac Super Seven horizontal on-edge infeed "FIN-SEAL" wrapping machine by Allpac, Inc. of Dallas, Tex., U.S.A..

Before describing the operation of this portion of the equipment, some additional description of some details may be helpful at this point. First, with respect to the retainer arms 53, in FIGS. 10 and 11 there is shown the outside face of side plate 39A and wherein one of the arms 53 is shown mounted to the stepped shaft 54 which is pivotally mounted in the side plates 39A and 39B.

Figure 10:
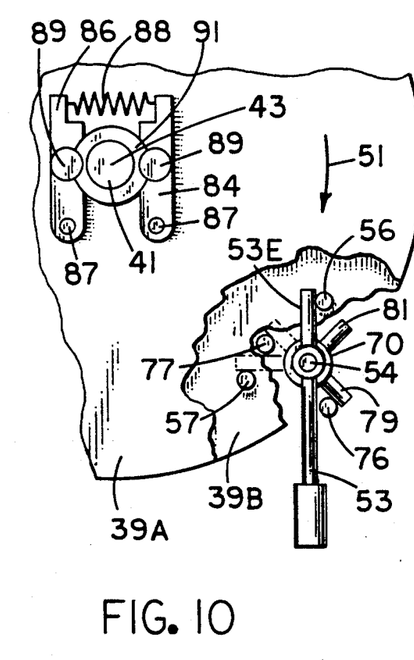
FIG. 10 is an enlarged fragmentary elevational view of one of the transfer wheel side plates showing one position of the stack retainer arms thereon.
Figure 11:
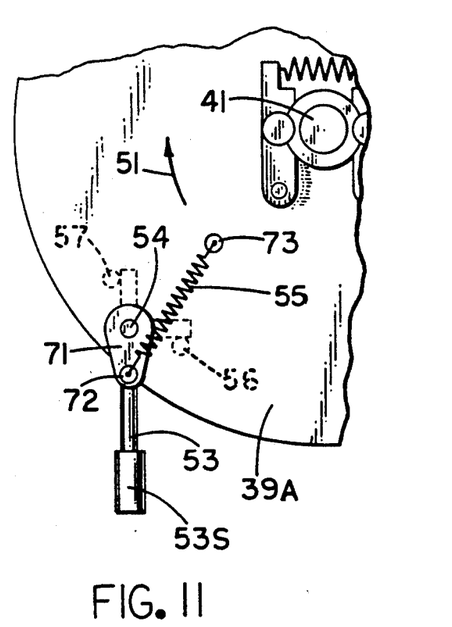
FIG. 11 is an enlarged fragmentary elevational view of the wheel side plates showing the wheel rotated about 90° from the FIG. 10 view and showing another position of the stack retainer arms on the transfer wheel.

A spring anchor block 71 is secured as by a set screw (not shown) to the shaft 54. This block has a spring hook receiving anchor pin 72 projecting outwardly therefrom and which receives the hook on one end of the spring 55. The hook on the other end of the spring 55 is connected to pin 73 secured in side plate 39A. As indicated above, this spring 55 in its relationship to the axis of shaft 54 and the anchor pin 72 in the spring anchor block 71 provides a toggling action over the center of the axis 54.

The limits to this toggling action can be better understood by reference to FIG. 10 wherein a portion of the side plate 39A is broken away to show a portion of the inside face of the other side plate 39B. That shows the stop pins 56 and 57 located 90° apart. These are situated so as to be engageable by the stack control arm extension 53E which extends through the larger diameter portion of shaft 54 which is between the side plates 39A and 39B and out to the arm 53. This extension need only be provided on that one of the arms 53 of a pair which is nearest the inside face of the side plate 39B. Therefore, by comparing FIGS. 10 with FIG. 11, it can be appreciated that the toggle spring 55 will hold the arm extension 53E against either the pin 56 or the pin 57.

To achieve the toggling action as the wheel turns in the direction of arrow 51, there are kick-pins secured to the frame of the machine. An outboard kick-pin 76 is positioned beside the side plate 39B and spaced radially outwardly therefrom with respect to the axis 43, a distance greater than the radius of the side plate. An inner kick pin 77 is also beside the outside face of side plate 39B, as is shown through the portion broken out of side plate 39B in FIG. 10 for illustration. That kick-pin 77 is also secured to the machine frame. As the wheel turns in the direction of arrow 51, and when the kick-pin 76 is engaged by the post 79 secured in collar 70, it will turn the shaft 74 (to which the collar 70 is fixed) in the counterclockwise direction, thus moving the arm 53 from the position shown relative to the wheel in FIG. 10 to a position such as shown relative to the wheel in FIG. 11. When it has moved in that direction, the arm extension 53E will have struck the post 57 in side plate 39B and it will stop the movement of the arm, so the arm will then remain in the position shown in FIG. 11. As the wheel continues to turn in the direction of arrow 51, the post 81 fixed in collar 70 will eventually strike another kick-pin such as 77 whereupon it will be toggled back to the relative position shown in FIG. 10 where the arm extension is stopped by the post 56 projecting inwardly from the side plate 39B. It should be pointed out here that the location of the kick-pin 77 illustrated in FIG. 10 is only figurative to show how such a pin is operable on post 81 when the transfer wheel turns. The location of the actual inboard kick-pin such as 77 with respect to the angular position of the wheel is different, as will become apparent in the following description of the operation.

Figure 8:
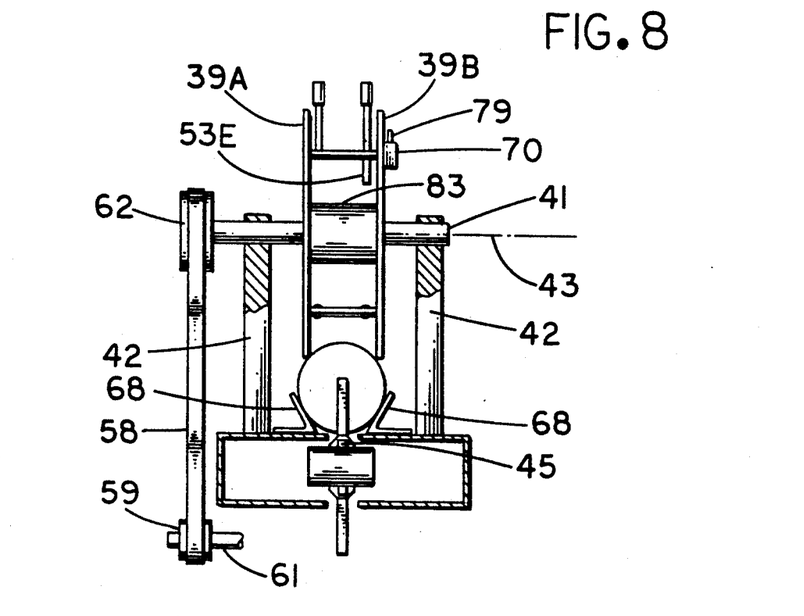
FIG. 8 is a section taken at line 8—8 in FIG. 7 and viewed in the direction of the arrows.

Further with reference to FIG. 10, it should be noted that the wheel side plates themselves are rigidly connected together as by a hub 83 (FIG. 8). There is a clutch arrangement which enables slippage of the shaft 41 with respect to the wheels under overload or jam conditions. This clutch involves a pair of arms 84 and 86, each of which is pinned as at 87 to the side plate 39A and both of which are resiliently urged toward each other at their distals ends by a spring 88. Each of these arms has a detent disk 89 secured to it and which is receivable in a detent groove as shown in the collar 91 fixed to shaft 41. Accordingly, if an overload condition exists, and the wheel is stalled relative to the shaft 41, the shaft can continue to turn as the grooves in the collar 91 secured thereto force the disks 89 outwardly against the resilient urging of the spring 88 and permit the shaft to continue to turn. If the jam condition is relieved in one-half turn of the shaft, the arms can again return to the normal position with the detent disks in the respective grooves, whereupon the drive of the wheel can resume.

Figure 9:
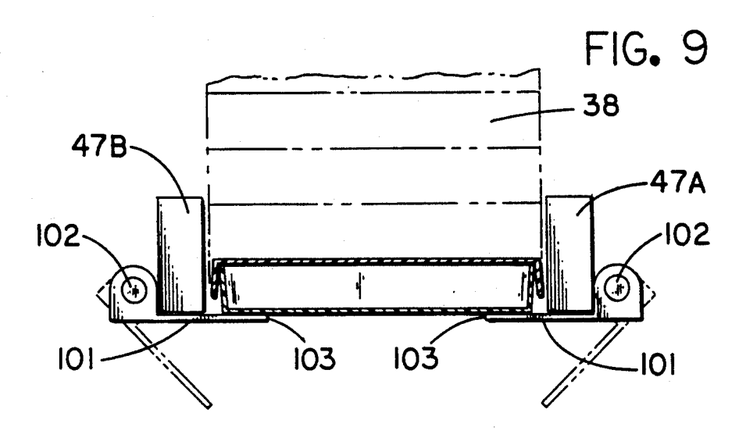
FIG. 9 is a section taken at line 9—9 in FIG. 5, but omitting the transfer wheel portions and showing only the operation of edge support plates during transfer of a stack from conveyor 37 to the wheel.

Referring now to FIG. 9, one of the petri dish assemblies from stack 38 is shown on top of a pair of edge support plates 101 which are mounted to pins 102 secured in the machine frame. These plates are spring loaded to normally rest against the bottom faces of the guidewalls 47A and 47B. However, as the transfer wheel turns in the direction of arrow 51 and moves a stack of petri dish assemblies in that direction, these plates are pushed down by the moving stack of dishes to the dotted line position shown in FIG. 9 to permit passage of the stack down to the infeed conveyor. As soon as the stack has passed the inboard edges 103 of the plates, the plates will then return under the spring urging to the position shown by solid lines in FIG. 9.

Figure 14:
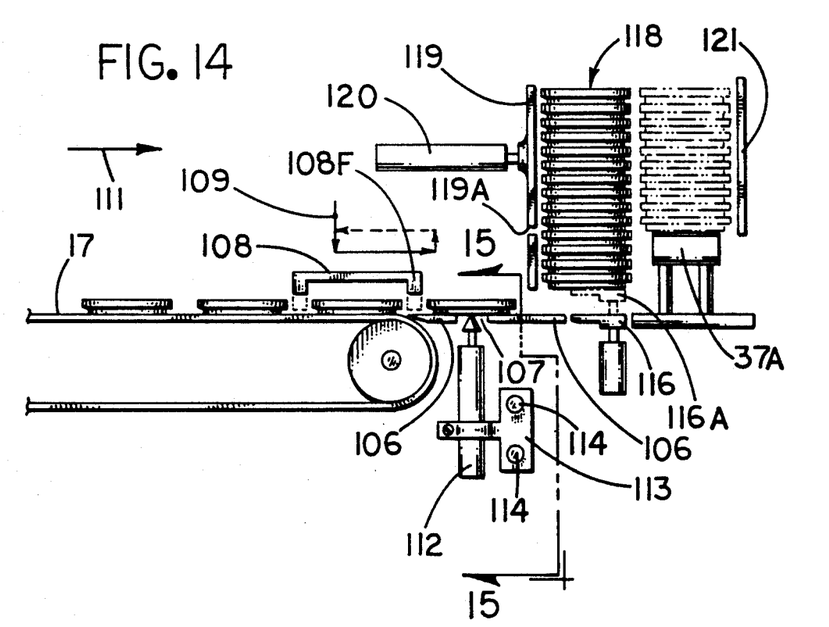
FIG. 14 is a schematic elevational view of a portion of FIG. 13 taken at line 14—14 in FIG. 13 and viewed in the direction of the arrows.
Figure 15:
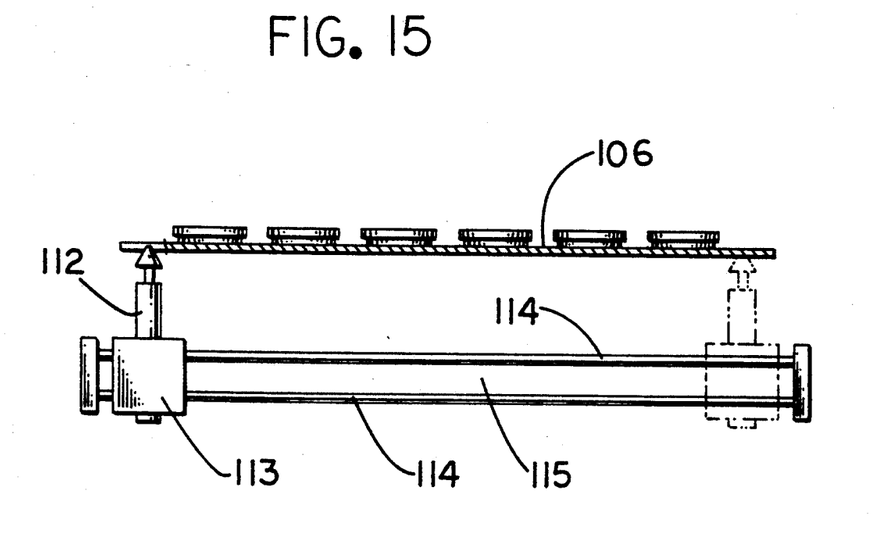
FIG. 15 is a schematic view of a portion of the print station taken at line 15—15 in FIG. 14 and viewed in the direction of the arrows.

Referring now particularly to FIG. 13, there is shown six columns of petri dish assemblies moving to the right off the end of conveyor 17. A plate 106 having a longitudinal slot 107 in it is at the discharge end of the conveyor. A transfer bar 108 (FIG. 14, not shown in FIG. 13) movably mounted to the machine frame, extends across the width of conveyor 17 at the exit end of it. This bar is pneumatically driven and has downwardly depending front and rear end flanges so that, when the bar moves down in the direction of arrow 109 (of the motion pattern in FIG. 14) it controls the front and rear edge of each of the six petri dish assemblies in a row and can quickly shift them from the end of conveyor 17 to the right in the direction of arrow 111 to position them over the slot 107. A "Video Jet" brand scanning print head 112 is mounted to a bracket 113 which runs on guide rods 114 parallel to a rodless cylinder 115 (FIG. 15). As the transfer bar 108 holds the row of petri dish assemblies over the slot 107, the print head 112 scans from left to right (FIG. 15) and, in response to a suitable sensor adjacent each column of dishes, triggers the print message to go on from the jet printer head 112 to the bottom of the petri dish. The scanning speed of the printer can be controlled so that the proper message is applied to the bottom of each dish. To avoid excessive fly back speeds, it is desirable to print one row of dishes as the head moves from left to right (FIG. 15) and the next row of dishes as the head returns from right to left. Then the transfer bar 108 rises and returns to the position shown in FIG. 14, whereupon it can move the next row of dishes into position over the slot 107. As it does so, the flange 108F at the front edge of the bar pushes the row of dishes which is over the slot 107 to the right onto the top of an elongate elevator platform 116 which extends the width of conveyor 17 and is operated by pneumatic cylinder 117. Then this elevator platform is activated to rise to the dotted line position 116A, and thereby lifts the row of six dishes up to the position shown in FIG. 14 whereupon the next row of dishes can be pushed into position almost halfway under the lowermost row of dishes in the stack 118. Then the elevator platform 116 can descend and the bar 108 will continue to push the next row of dishes the rest of the way under the lowermost row of dishes in the stack and onto platform 116. Then the elevator cylinder is again actuated to raise the platform 116 and thereby lift the row of dishes in the stacks, and admit the next row partially under the stacks, and so on.

When the six stacks are high enough that ten petri dish assemblies above the level of conveyor 37A can be peeled off the top of each, a transfer plate 119, operated by pneumatic cylinder 120 is actuated to push the ten top assemblies to the right in the direction of arrow 111 until they stop at the guidewall 121. They are thereupon atop the upper flight of stack conveyor 37A by which they will be moved laterally in the direction of arrow 122 (FIG. 13) to the position where the front or leading stack 38A of the six stacks is in a position to be pushed onto the transfer wheel 39 as previously described. In this example, the conveyor 37A is serving the function of the conveyor 37 in FIG. 3.

The lower edge 119A of the transfer plate is just above the level of the top of conveyor 37A. That level is higher than the normal height of conveyor equipment 17 and 46, since it is necessary to transfer a stack from the wheel onto the infeed conveyor 46. The height difference depends on the height of the infeed conveyor 46, the height of the cooling conveyor 17, the diameter of the petri dish assemblies, the spacing between plates 39A and 39B and their diameter at the circle where they contact the edges of the petri dish covers.

Figure 16:
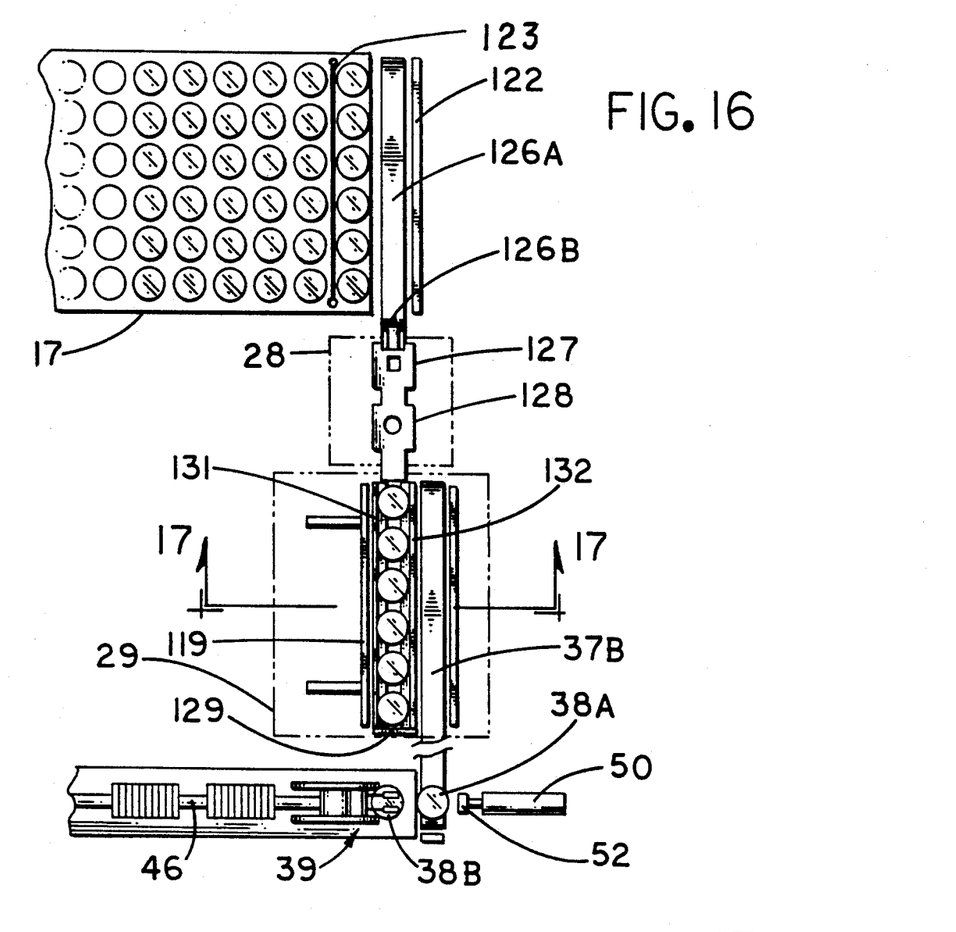
FIG. 16 is a schematic plan view of the single row, in-line stacker interface between the system portion shown in FIGS. 4 and 12 and the wrapper system 22 in FIG. 2.
Figure 17:
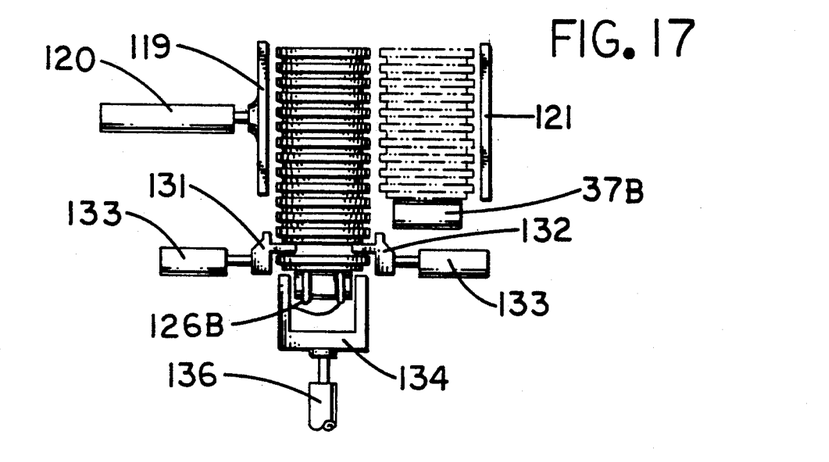
FIG. 17 is a schematic sectional view taken at line 17—17 in FIG. 16 and viewed in the direction of the arrows and illustrating the stacker and stack-to-conveyor transfer portion of that view.

Referring now to FIGS. 16 and 17, they show schematically the single row in-line stacker interface between the cooling conveyor 17 and the curved transfer bar 52. It should be understood in this case, that there are six columns of petri dishes moving to the right just as in FIG. 13. However, in this case, instead of a wide transfer bar 108 moving the rows of dishes, row-by-row off the end of the conveyor 17, a narrow bar 123 movably mounted to the machine frame and pneumatically driven, moves each row directly off the end of conveyor 17 onto a lateral conveyor system 126 which moves the dishes laterally with respect to conveyor 17 in the direction of arrow 122. Conveyor system 126 includes an endless belt take-off conveyor 126A which takes the dish assemblies away from the discharge end of cooling conveyor 17. System 126 also includes a pair of horizontally-spaced endless belts at 126B which move the dish assemblies from the end of 126A over a label applicator 127 of conventional construction, and a stationary jet print head 128, also of conventional construction, where relevant information is printed on the bottoms of the dishes. The conveyor moves them on through those stations to position against a stop 129. As shown in FIG. 17, there are two stack guide and support rail units 131 and 132 located generally over the conveyor 126B and "upstream" from the stop wall 129. Each of these is long enough to support a row of six dish assemblies and is operable by a pneumatic cylinder 133 to pull it away horizontally from the position shown wherein the rails are supporting six stacks of petri dish assemblies as shown in FIG. 17. When six new petri dish assemblies have arrived in a row, with the leading assembly stopped against the wall 129, a U-shaped elevator channel 134 located below the conveyor 126B and operable by pneumatic cylinders 136 is moved upward to engage the six dishes in a row and, upon actuation of the cylinders 133 pulling the rails 131 and 132 apart, the elevator can push the bottom row of dishes up to the position where, upon return of the rails 132 and 131 by reverse operation of cylinders 133, the rails will support the new row of dishes at the bottom of the stacks. Then the elevator returns to original position shown in FIG. 17. When the stacks are high enough that there are ten at the top above the level of the top of a conveyor 37B, a transfer bar 119 operable by cylinder 120 peels the top ten dish assemblies from each of the six stacks off to the right and pushes them against a wall 121 in the same manner as previously described with reference to FIGS. 13 and 14. In this case, the conveyor 37B is a shorter conveyor than conveyor 37A in FIG. 13, since it only has to handle six stacks at a time, but it serves the same purpose as conveyor 37 in FIG. 3 as described above. The stacks being more than ten high on rails 131 and 132 is due to the fact that conveyor 37B is at a level above the standard height of the conveyor 17 for appropriate transfer to the wheel 39 as described above.

Figure 5:
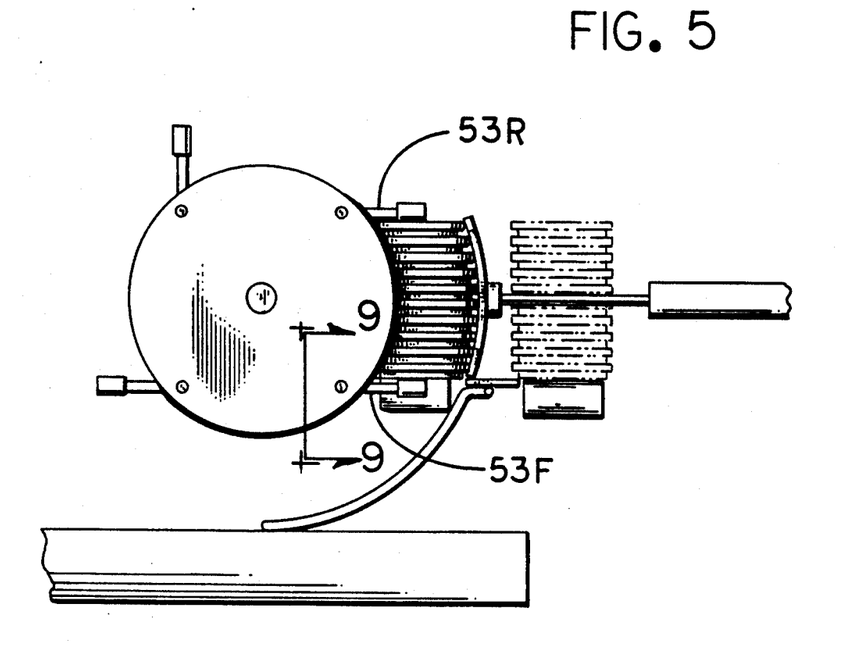
FIG. 5 is a view similar to FIG. 4 showing retainer arms on the transfer wheel gripping the stack.
Figure 6:
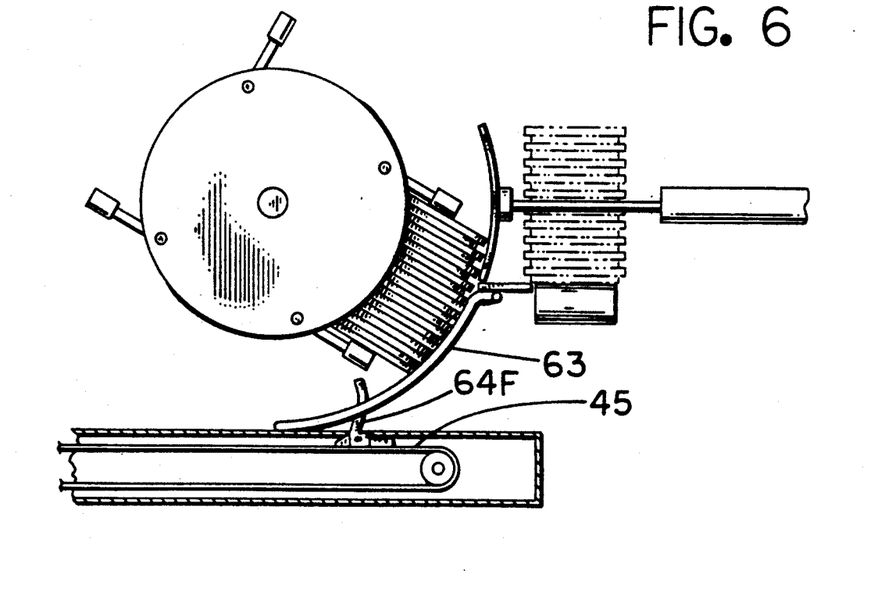
FIG. 6 is a view similar to FIG. 5 showing a further step in the process where the stack is moving toward the infeed conveyor 46.
Figure 7:
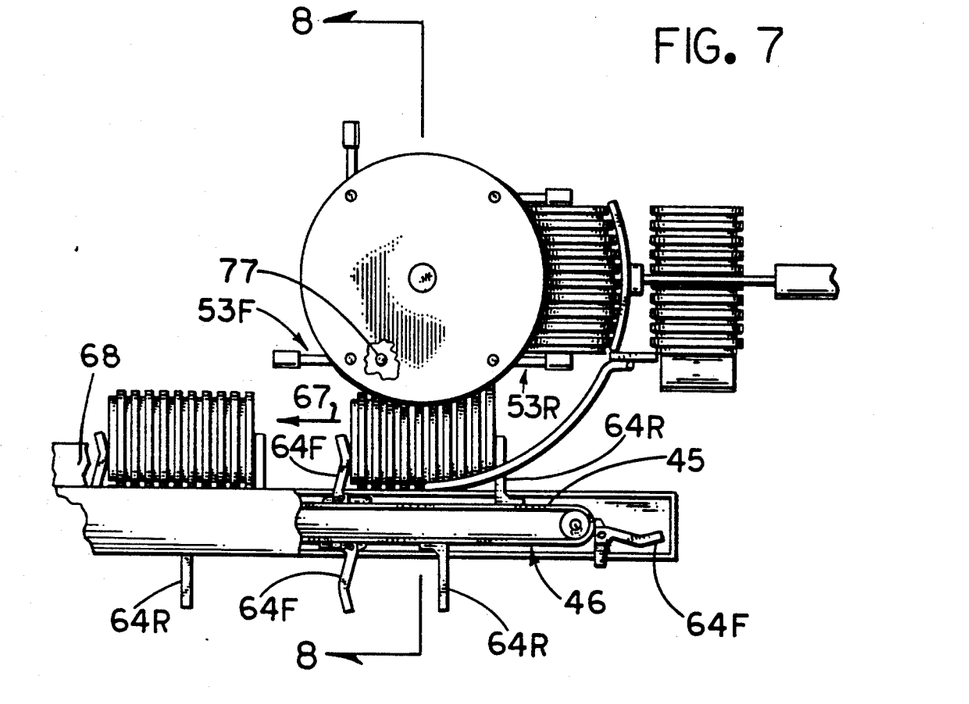
FIG. 7 is a view similar to FIG. 6 showing a further step where the stack is moved onto the infeed conveyor.

In both the FIG. 1 and FIG. 2 versions of the invention, the various components are synchronized as needed in order to deliver the stacks of petri dish assemblies to the transfer wheel 39 and deliver them from the transfer wheel 39 to the infeed conveyor. After a stack is pushed by the bar 52 from atop the conveyor 37 against the turning wheel 39 (FIG. 4), the retainer arm pair 53R immediately above the stack 38B engages the top of the stack, and a kick pin 76 (FIGS. 4 and 10) will trip the retainer arm pair 53F in the counter-clockwise direction to engage the front end of the stack as shown in FIG. 5. The stack is thereupon moved down by the wheel 39 as shown in FIG. 6 until the bottom dish assembly engages one of the lugs 64F of the conveyor 46 and may resiliently pivot the lug forward to some extent as the conveyor lug moves to the left and the wheel, in synchronization therewith continues to turn clockwise. After the stack has moved onto the conveyor, and as wheel 39 continues to turn, post 81 (FIG. 10) will hit kick pin 77 located approximately as shown in FIG. 7 where the wheel sideplates are broken away to show the kick pin as secured on the machine frame behind the wheel 39. This will toggle the retainer arm pair 53F to the position shown relative to the wheel as in FIG. 10 and as in the two at the left of the section line 8—8 and the one to the upper right of the section line 8—8, in FIG. 7. Accordingly, these retainer arms are in position to engage the top of stacks subsequently pushed onto the wheel by the pusher bar 52. Meanwhile, kick pin 76 has toggled retainer arm pair 53R counterclockwise to engage the bottom (leading) dish of the next stack pushed onto the wheel 39 by bar 52.

It will be recognized by the reader that there is some synchronization of events required, as by position sensor switches, valves and the like, but these are within the skill of the art, now that the invention and its operation have been described.

The petri dish assemblies mentioned in the foregoing description are typically 1.5 cm high and 9 cm in diameter. It should be evident that the present invention is useful with other low profile items where horizontal dimensions exceed their vertical dimensions. The invention takes low profile articles from their generally flat attitude, puts them together in bunches, gently turns them on edge and transports them on edge in bunches for further processing as by a wrapping machine, for example.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In a system comprising an article conveyor, assembler means for receiving articles from the conveyor and assembling the articles into a plurality of bunches of articles, the improvement comprising:
    a wheel;
    first transfer means for taking bunches of articles from the plurality of bunches and pushing the bunches, one bunch at a time, onto the wheel;
    retainers on the wheel and operable, when actuated, to hold the bunches on the wheel; and
    an output conveyor associated with the wheel and having retainers operable, when actuated, to receive bunches sequentially from the wheel.

2. The improvement of claim 1 and wherein:
    the bunches are vertical stacks of articles and the wheel has side members with surfaces curved about the rotational axis of the wheel, the surfaces being spaced from each other along said axis for cradling the stacks when pushed onto the wheel; and
    the first transfer means includes shaped wall means operable to engage a linear stack and conform the stack to the contour of the cradling surfaces.

3. The improvement of claim 2 and further comprising:
    a wrapping machine, the output conveyor being an infeed conveyor to the wrapping machine.

4. The improvement of claim 2 and wherein the retainers on the wheel are toggle-action retainers.

5. The improvement of claim 4 and further comprising:
    synchronizing means synchronizing linear movement of the output conveyor with the lineal surface speed of the portion of the wheel carrying the stacks.

6. The improvement of claim 5 and wherein:
    the retainers on the output conveyor include linearly spaced lugs which collaborate with the toggle action retainers on the wheel to enable the lugs to take the stacks from the wheel, one stake at a time.

7. The improvement of claim 6 and wherein:
    the toggle action retainers are four pairs of arms extending outwardly with respect to the rotational axis of the wheel; and
    the output conveyor has a take-off portion adjacent the wheel, with one of the lugs moving upward between one pair of retainer arms to resiliently engage the front end article of a stack as the stack moves from the wheel onto the take-off portion of the conveyor.

8. The improvement of claim 7 and wherein:
    the output conveyor is a longitudinally extending article support belt and has a drive chain centered between longitudinally extending edges of the belt, with the lugs being connected to the chain, and certain of said lugs being at the front end of each stack and spring loaded to facilitate meshing of a stack from the wheel onto the conveyor.

9. The improvement of claim 7 and wherein:
    the wheel is mounted to a stationary member, and first toggling means are mounted on the stationary member and operable on each pair of arms at the front end of a stack as the pair moves away from the take-off portion to the output conveyor to toggle the arms into a forwardly inclined and pointing direction to release them from the stack being deposited on the output conveyor.

10. The improvement of claim 9 and further comprising:
    second toggling means mounted on the stationary member and operable on each pair of arms at the front end of a stack when the first transfer means pushes a stack onto the wheel to toggle the arms into a rearwardly inclined and pointing direction to engage the front end article of a stack as the stack is pushed onto the wheel.

11. The improvement of claim 10 and further comprising:
    a pair of guide rails radially outward from the wheel and which are generally parallel and spaced in a direction of the rotational axis of the wheel and curved about the wheel and extending from a location adjacent the first transfer means to a location adjacent the take-off portion to guide a stack as it moves on the wheel from the first transfer means to the take-off portion.

12. The improvement of claim 1 and wherein the article conveyor has a discharge end, and the assembler means are adjacent the wheel, the improvement further comprising:
    first intermediate conveyor means to receive article from the discharge end of the article conveyor and transport the articles to positions in line at the assembler means;
    second intermediate conveyor means for delivery of bunches to the first transfer means; and
    second transfer means associated with the assembler means to transfer bunches of articles from the assembler means to the second intermediate conveyor means.

13. The improvement of claim 12 and further comprising:
    printing means associated with the first intermediate conveyor means to print indicia on the bottom of articles as they are conveyed to the assembler means.

14. The improvement of claim 13 and further comprising:

labeling means associated with the first intermediate conveyor means to apply labels to the bottoms of articles as they are conveyed to the assembler means.

15. The improvement of claim 12 and wherein:

the first intermediate conveyor means are oriented to move the articles in a direction transverse to the direction of movement of the articles on the article conveyor.

16. The improvement of claim 15 and wherein:

the output conveyor is oriented to move the bunches parallel to the movement of the articles on the article conveyor.

17. The improvement of claim 16 and wherein:

the operation of the output conveyor is such as to move the bunches in a direction opposite the direction of movement of the articles on the article conveyor.

18. The improvement of claim 12 and wherein the assembler means is a stacker which includes:

an elevator under a portion of the first intermediate conveyor means and operable, when actuated, to lift the articles from the first intermediate conveyor means;

stack support rails above the elevator; and power means operable, when actuated, to move the rails from stack supporting position to admit articles on the elevator below and lifted by the elevator and then return to position supporting the newly admitted articles.

19. The improvement of claim 18 and wherein:

the elevator means is arranged to lift a row of articles from the first intermediate conveyor means simultaneously for stacking the articles in a row of stacks.

20. The improvement of claim 19 and wherein:

the second transfer means is arranged to transfer upper portions of the stacks to the second intermediate conveyor means simultaneously.

21. The improvement of claim 20 and wherein:

the articles are petri dish assemblies each including a dish, gelled medium in the dish, and a cover on the dish.

22. A method of taking individual low-profile articles and assembling them in bunches of individual articles placed on edge for processing and comprising the steps of:

stacking the articles in stacks;

transferring the stacks individually to a transfer wheel;

turning the wheel with the transferred stacks on it about a horizontal axis to move the stacks through an arc of ninety degrees so that the articles are on edge; and transporting the articles on edge in individual bunches from the wheel for further processing.

23. The method of claim 22 and further comprising the steps of:

contouring the stacks to the wheel as they are transferred to the wheel.

24. The method of claim 22 and wherein the articles are petri dish assemblies having petri dishes with gelled media therein and covers thereon and having central axes, the method further comprising the steps of:

holding the stacks on the wheel between resiliently biased arms on the wheel.

25. The method of claim 24 and further comprising the steps of:

toggling a retainer into resiliently-biased engagement with a stack upon transfer of the stack to the wheel; and toggling the retainer out of engagement with the stack when the wheel has turned the stack so that the dish assembly axes are horizontally disposed.

26. The method of claim 22 and further comprising the step of:

engaging both ends of the stack on the transfer wheel and holding the articles together in the stack; and continuing to hold the articles in each stack together while on the wheel as the stacks are moved through the arc.

* * * * *